(12) United States Patent
Fort (10) Patent No.: US 11,943,019 B2
(45) Date of Patent: Mar. 26, 2024

(54) LOW-POWER MULTI-ANTENNA SYNCHRONIZATION (71) Applicant: Qorvo US, Inc., Greensboro, NC (US)

(72) Inventor: Andrew Fort, Kessel Lo (BE)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 17/457,459

(22) Filed: Dec. 3, 2021

(65) Prior Publication Data
US 2023/0179274 A1 Jun. 8, 2023

(51) Int. Cl.
H04L 5/12 (2006.01)
H04B 7/06 (2006.01)
H04B 17/327 (2015.01)
H04W 52/02 (2009.01)

(52) U.S. Cl.
CPC ......... *H04B 7/0608* (2013.01); *H04B 17/327* (2015.01); *H04W 52/0232* (2013.01)

(58) Field of Classification Search
CPC H04B 7/0608; H04B 17/327; H04W 52/0232
USPC ........ 375/262, 261, 260, 259, 219, 295, 316
See application file for complete search history.

(56) References Cited

U.S. PATENT DOCUMENTS

| | | | |
|---|---|---|---|
| 5,831,981 A | 11/1998 | Tanimura et al. | |
| 8,279,974 B1 * | 10/2012 | Husted | H04L 25/06 375/316 |
| 10,637,642 B2 | 4/2020 | Fort | |
| 10,667,102 B2 | 5/2020 | Fort | |
| 11,133,890 B2 | 9/2021 | Fort | |
| 2006/0002495 A1 * | 1/2006 | Shirakawa | H03G 3/3052 375/345 |
| 2006/0133544 A1 | 6/2006 | Kawada et al. | |
| 2010/0135437 A1 * | 6/2010 | Lee | H04L 27/2647 375/345 |

(Continued)

FOREIGN PATENT DOCUMENTS

| | | | | |
|---|---|---|---|---|
| CN | 115144821 B | * | 11/2022 | |
| JP | 2002084153 A | * | 3/2002 | ........... H03G 3/3078 |
| JP | 2012122960 A | * | 6/2012 | |

OTHER PUBLICATIONS

Author Unknown, "Core System Package [Low Energy Controller volume]," Specification of the Bluetooth System, vol. 6, Version 5.1, Jan. 21, 2019, Bluetooth SIG, 301 pages.

(Continued)

*Primary Examiner* — Zewdu A Kassa
(74) *Attorney, Agent, or Firm* — Withrow & Terranova, P.L.L.C.

(57) ABSTRACT

Systems and methods for low-power multi-antenna synchronization are disclosed. In one aspect, a computing device, such as an Internet of Things (IoT) computing device, may include a transceiver operating using BLUETOOTH LOW ENERGY (BLE) with multiple antennas. In an exemplary aspect, each of a plurality of antennas is coupled to a respective edge detection circuit. When an incoming signal is detected by one of the edge detection circuits, circuitry associated with others of the multiple antennas may be placed in a low-power mode while circuitry associated with the detecting edge detection circuit attempts to synchronize with the incoming signal to see if the incoming signal is a signal of interest.

17 Claims, 5 Drawing Sheets

(56) References Cited

U.S. PATENT DOCUMENTS

| | | | | |
|---|---|---|---|---|
| 2010/0169675 | A1* | 7/2010 | Kajihara | G06F 1/3237 |
| | | | | 713/400 |
| 2010/0233986 | A1* | 9/2010 | Yamaji | H04B 1/123 |
| | | | | 455/314 |
| 2013/0148766 | A1 | 6/2013 | Urabe et al. | |
| 2014/0113679 | A1* | 4/2014 | Wehrmann | H04B 1/0458 |
| | | | | 455/550.1 |
| 2015/0303990 | A1* | 10/2015 | Chen | H04B 17/382 |
| | | | | 375/132 |
| 2018/0359077 | A1* | 12/2018 | Haine | H04B 7/0817 |
| 2019/0088056 | A1* | 3/2019 | Telljohann | G07C 9/00309 |
| 2020/0287658 | A1 | 9/2020 | Fort | |
| 2021/0119706 | A1* | 4/2021 | Sola | G02B 26/0875 |
| 2021/0120496 | A1* | 4/2021 | Desai | H04W 52/0238 |

OTHER PUBLICATIONS

Fort, A. et al., "A performance complexity comparison of auto-correlation and cross-correlation for OFDM Burst Synchronization," 2003 IEEE International Conference on Acoustics, Speech, and Signal Processing (ICASSP'03), Apr. 6-10, 2003, Hong Kong, China, IEEE.

Proakis, J.G., "Digital Communications," Fourth Edition, Boston: McGraw Hill, 2000, 936 pages.

Ho, C.K. et al., "High Bandwidth Efficiency and Low Power Consumption Walsh Code Implementation Methods for Body Channel Communication," IEEE Transactions on Microwave Theory and Techniques, vol. 62, No. 9, Sep. 2014, IEEE, pp. 1867-1878.

Kim, T.-H et al., "Two-Step Approach for Coarse Time Synchronization and Frequency Offset Estimation for IEEE 802.16D Systems," 2007 IEEE Workshop on Signal Processing Systems, Oct. 17-19, 2007, Shanghai, China, IEEE, 6 pages.

Song, H. et al., "A Secure TOF-Based Transceiver with Low Latency and sub-cm Ranging for Mobile Authentication Applications," 2018 IEEE Radio Frequency Integrated Circuits Symposium (RFIC), Jun. 10-12, 2018, Philadelphia, PA, USA, IEEE, pp. 160-163.

Extended European Search Report for European Patent Application No. 22207882.6, dated Apr. 11, 2023, 13 pages.

Extended European Search Report for European Patent Application No. 23163553.3, dated Aug. 7, 2023, 10 pages.

* cited by examiner

LOW-POWER MULTI-ANTENNA SYNCHRONIZATION

BACKGROUND

I. Field of the Disclosure

The technology of the disclosure relates generally to diversity antennas in low-power environments.

II. Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences. With the advent of the myriad functions available to such devices, there has been increased pressure to find ways to reduce power consumption. The pressure to reduce power consumption is particularly acute in the class of computing devices known as the Internet of Things (IoT), which are typically small, wearable devices that operate at relatively short ranges and are coin-cell battery powered.

Because of battery size, the pressure to conserve power is a commercial reality. Historically, IEEE 802.15.4 (Zigbee) has been used for IoT devices. Where Zigbee has been used in devices having multiple antennas, the long synchronization word used by Zigbee has allowed a single radio frequency front end (RFFE) to be used for all antennas in a time-sharing arrangement. More detail on such an approach can be found in U.S. Pat. No. 5,831,981. There has been a movement in the industry to move towards BLUETOOTH LOW ENERGY (BLE). For success in a smart-home environment, BLE radio designs must be low-power and provide sufficient range to cover an entire household, even where line-of-sight may be compromised. Current designs increase range by using lower data rates such as the 125 kilobits per second (kbps) and 500 kbps coded physical layer (PHY) modes. Such modes entail longer packets and higher duty-cycles, which, in turn, increases power consumption. This design compromise leaves room for improvement in designing a power-efficient solution for IoT devices and particularly for IoT devices that use BLE.

SUMMARY

Aspects disclosed in the detailed description include systems and methods for low-power multi-antenna synchronization. In particular, a computing device, such as an Internet of Things (IoT) computing device, may include a transceiver operating using BLUETOOTH LOW ENERGY (BLE) with multiple antennas. In an exemplary aspect, each of a plurality of antennas is coupled to a respective edge detection circuit. When an incoming signal is detected by one of the edge detection circuits, circuitry associated with others of the multiple antennas may be placed in a low-power mode while circuitry associated with the detecting edge detection circuit attempts to synchronize with the incoming signal to see if the incoming signal is a signal of interest. By placing portions of the circuitry in low-power or sleep modes, power savings are achieved.

In this regard in one aspect, a receiver is disclosed. The receiver comprises a received signal strength indicator (RSSI) circuit configured to receive a signal from an antenna. The receiver also comprises an edge detection circuit coupled to the RSSI circuit and configured to detect a new incoming signal compared to an existing environment. The receiver also comprises a synchronization circuit configured to use a correlation algorithm to synchronize to the signal from the antenna. The receiver also comprises a control circuit. The control circuit is configured to turn off the synchronization circuit. The control circuit is also configured to, responsive to detection of the new incoming signal by the edge detection circuit, turn on the synchronization circuit.

In another aspect, a method for controlling a receiver is disclosed. The method comprises turning off a synchronization circuit. The method also comprises detecting an incoming signal with an edge detection circuit. The method also comprises, responsive to detecting the incoming signal, turning on the synchronization circuit.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include systems and methods for low-power multi-antenna synchronization. In particular, a computing device, such as an Internet of Things (IoT) computing device, may include a transceiver operating using BLUETOOTH LOW ENERGY (BLE) with multiple antennas. In an exemplary aspect, each of a plurality of antennas is coupled to a respective edge detection circuit. When an incoming signal is detected by one of the edge detection circuits, circuitry associated with others of the multiple antennas may be placed in a low-power mode while circuitry associated with the detecting edge detection circuit attempts to synchronize with the incoming signal to see if the incoming signal is a signal of interest. By placing portions of the circuitry in low-power or sleep modes, power savings are achieved.

As noted above, there has been a movement to BLE for IoT devices. Instead of using the lower data rates associated with BLE to extend range, one option is to use a multi-antenna system to take advantage of spatial diversity. One low-power approach to implementing such a multi-antenna system would be to borrow from the teachings of the '981 patent where a single radio frequency front end (RFFE) uses time-multiplexing to switch between antennas. Data collected from each antenna is analyzed to select a best antenna for signal reception. Such approach may work for angle of arrival applications where a lengthy tone is appended to the end of a packet, and the antenna is switched during the tone so that phase measurements may be made on each antenna. In other applications, where such a tone is not present, BLE has a comparatively short non-repeating synchronization word, which makes synchronization difficult using a time-multiplexing antenna approach given settling transients whenever switching between antennas occurs. Additionally, this approach does not allow for antenna combining techniques to maximize the range of the system.

In most diversity systems, each antenna may have some form of correlation-based synchronization circuitry, which provides information about the signal being received at the respective antenna. Based on this information, an antenna may be selected, or a combination of signals may be made. The correlation circuitry consumes power. For such a system, more antennas mean more correlation circuitry, and therefore higher power consumption.

Exemplary aspects of the present disclosure provide systems and methods to help reduce power consumption for multi-antenna systems such as an IoT system that uses BLE. In particular, exemplary aspects of the present disclosure leave correlation circuitry in a low-power mode until such a time as a signal of interest is detected. An antenna with the most interesting signal is selected and the signal of interest is provided to newly-awakened correlation circuitry. By delaying activation of the correlation circuitry, power consumption is reduced.

Figure 1:
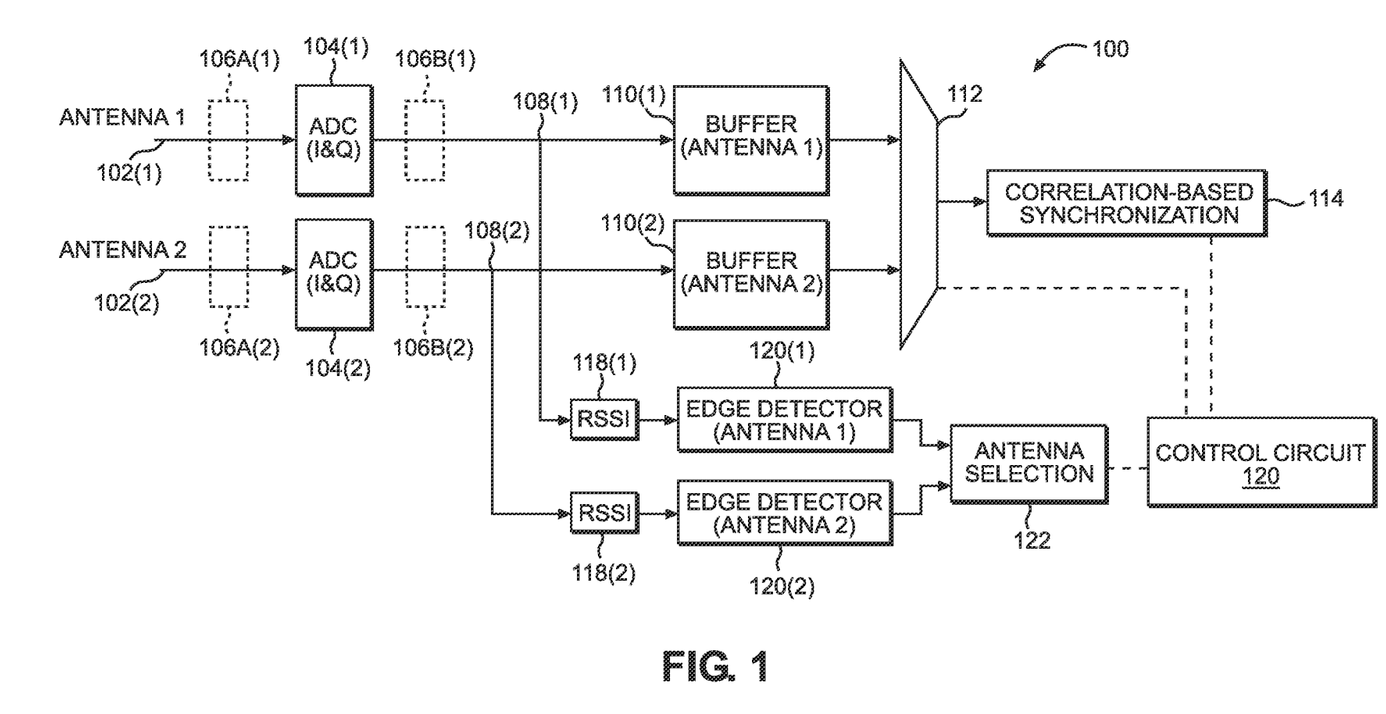
FIG. 1 is a block diagram of an exemplary multiple-antenna system that uses edge detection to perform antenna selection.

In this regard, FIG. 1 is a block diagram of a receiver 100 with antennas 102(1)-102(2). While the entirety of the description contained herein focuses on two-antenna systems, it should be appreciated that the teachings of the present disclosure are applicable to systems with more than two antennas. The antennas 102(1)-102(2) may be coupled to respective analog-to-digital converters (ADCs) 104(1)-104(2). In an exemplary aspect, the ADCs 104(1)-104(2) may process in-phase (I) and quadrature (Q) portions of the signals. Immediately before, or immediately after the ADCs 104(1)-104(2) other digital signal processing (DSP) blocks to condition the signal for detection (e.g., a channel select filter) may be provided as illustrated by DSPs 106A(1), 106B(1), 106A(2), 106B(2). Respective nodes 108(1)-108(2) exist after the ADCs 104(1)-104(2) (and perhaps after the DSPs 106B(1)-106B(2)).

The signals from the antennas 102(1)-102(2) are split at the respective nodes 108(1)-108(2). Respective first portions of the signals are provided to buffers 110(1)-110(2). The buffers 110(1)-110(2) may be sized large (or long) enough to account for the expected delay of the edge detection circuits 120(1)-120(2) (described below) so that data arriving just prior to the edge detection can be used for synchronization. The buffers 110(1)-110(2) are coupled to a multiplexer (MUX) 112. The MUX 112 is coupled to a synchronization circuit 114. The synchronization circuit 114 may be coupled to and controlled by a control circuit 116. The synchronization circuit 114 drains data from one or more of the buffers 110(1)-110(2) and uses this data to determine if the signal of interest is an actual signal to be received. The control circuit 116 may also be coupled to and control the MUX 112. In an exemplary aspect, the synchronization circuit 114 may conform to the teachings of U.S. Pat. No. 10,667,102, which is hereby incorporated by reference in its entirety.

Respective second portions of the signals are provided from the nodes 108(1)-108(2) to respective received signal strength indicator (RSSI) circuits 118(1)-118(2). The respective RSSI circuits 118(1)-118(2) are coupled to respective edge detection circuits 120(1)-120(2). The edge detection circuits 120(1)-120(2) are coupled to an antenna selection circuit 122. While shown as a distinct circuit in FIG. 1, the antenna selection circuit 122 may be part of the control circuit 116.

Figure 2:
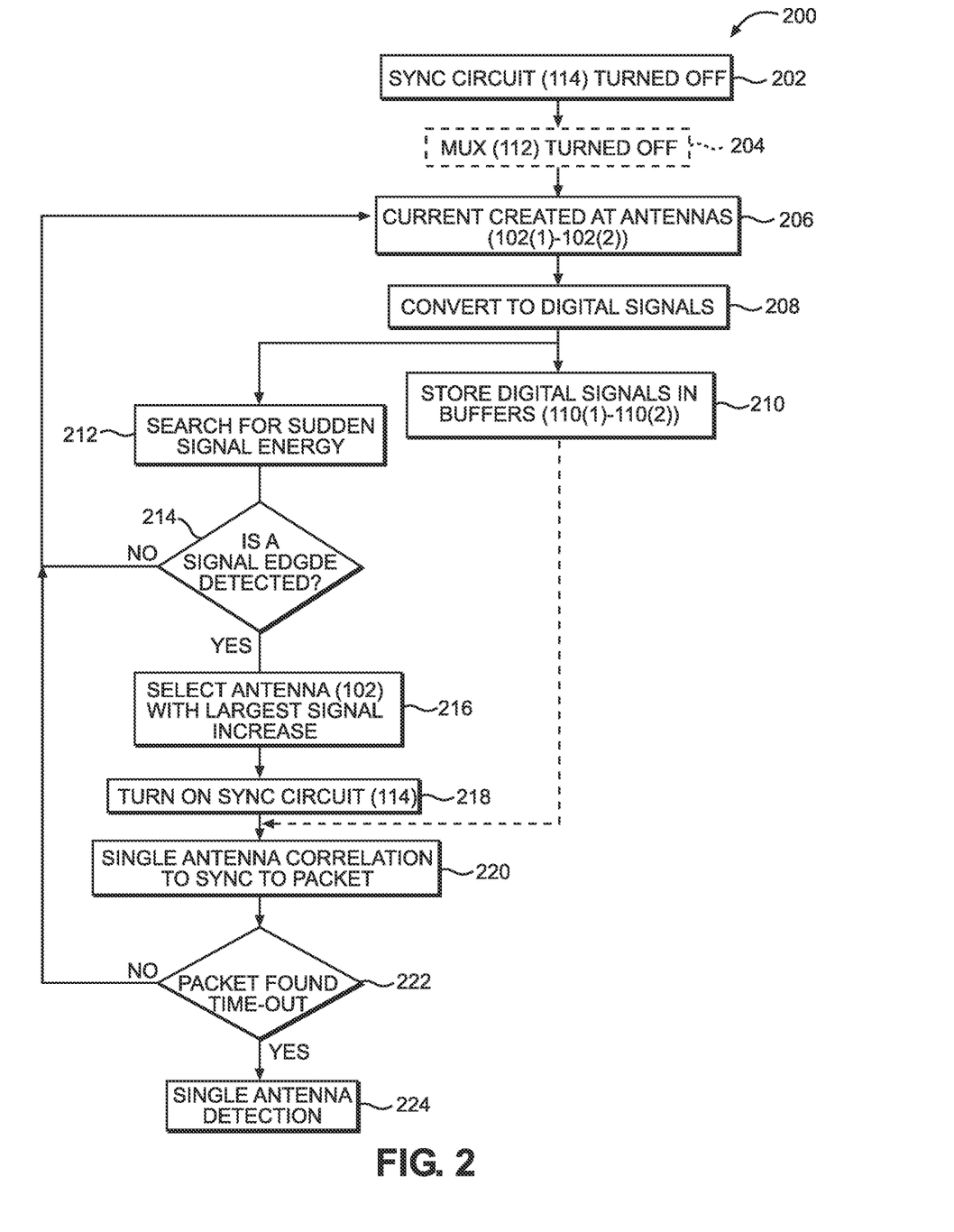
FIG. 2 is a flowchart illustrating an exemplary process of operation of the antenna system of FIG. 1.

FIG. 2 provides a flowchart of a process 200 for the receiver 100 in use. The process 200 starts with the synchronization circuit 114 turned off or placed in a low-power mode (block 202). Additionally, the MUX 112 may likewise be turned off or placed in a low-power mode (block 204). In other words, both antenna paths may be active, but the synchronization hardware is turned off. Electromagnetic waves and noise may impinge on the antennas 102(1)-102 (2) creating a current therein (block 206), which may be conditioned by the DSPs 106(1)-106(2) and converted into a digital signal by the respective ADCs 104(1)-104(2)(block 208). Such digital signals are stored in the buffers 110(1)-110(2) (block 210).

The digital signals are also processed by the RSSI circuits 118(1)-118(2), and the output provided to the edge detection circuits 118(1)-118(2) to search for sudden signal energy indicative of a possible signal of interest (block 212) relative to an existing environment (e.g., background noise, known received signals not of interest (e.g., out of bandwidth), or the like). As better explained with reference to FIG. 3 below, the edge detection circuits 120(1)-120(2) determine if a signal edge is detected (block 214). If the answer to block 214 is no, then the process 200 returns to block 206. If, however, a signal edge is detected at block 214, then the antenna selection circuit 122 selects an antenna 102(2)-102 (2) with the largest signal increase (block 216). By performing antenna selection prior to synchronization, only a single correlation and synchronization circuit 114 needs to be active during synchronization, reducing power consumption compared with typical antenna diversity systems. The control circuit 116 then turns on the synchronization circuit 114 (block 218) and the data stored in the buffer 110(1)-110(2) corresponding to the selected antenna 102(2)-102(2) is provided to the synchronization circuit 114 by the MUX 112. As noted, the buffer 110(1)-110(2) may contain data exceeding a time to edge detection and selection.

The synchronization circuit 114 then uses a correlation algorithm to perform single antenna correlation calculations on the signal to synchronize to a packet (block 220). The synchronization circuit 114 (or the control circuit 116) determines if a packet was found before a time out occurs (block 222). If a time out occurs, the synchronization circuit 114 will stop searching for new packets, complete any existing computations in progress, and the process 200 returns to block 206. Note that if another edge is detected before the time out, the process 200 may reset the timer associated with the time out. If, however, a packet is found at block 222, the process 200 concludes with single antenna detection (block 224) and signal processing.

In an exemplary aspect, the time out may be approximately one hundred fifty microseconds (150 µs). 150 µs corresponds to a minimum time between packet transmissions for BLE. Approximately, as used herein means within five percent (5%). While approximately 150 µs is contemplated, it should be appreciated that even lower timeouts can be used in specific applications or to trade off reliability and power consumption. In general, timeouts should be set as short as possible to minimize power consumption, but long enough to account for the time between the start of a packet transmission and when a worst-case device can actually synchronize to the packet. The timeout may also need to account for pre-packet transmissions including time needed to ramp up a power amplifier or for analog frequency synthesizers to settle. Time outs should additionally be chosen to be long enough that the long-term average will have time to converge to a new level reflecting the new signal environment. It should be appreciated that the time outs may be programmed as needed during installation or manufacture.

Note that optionally any non-selected antenna path (e.g., ADC, buffer, and DSP circuits) may be turned off while the synchronization circuit 114 operates. Powering down a non-selected antenna path may save power, but also may hinder the diversity reception if conditions change to make the non-selected antenna path the better receiving path.

Figure 3:
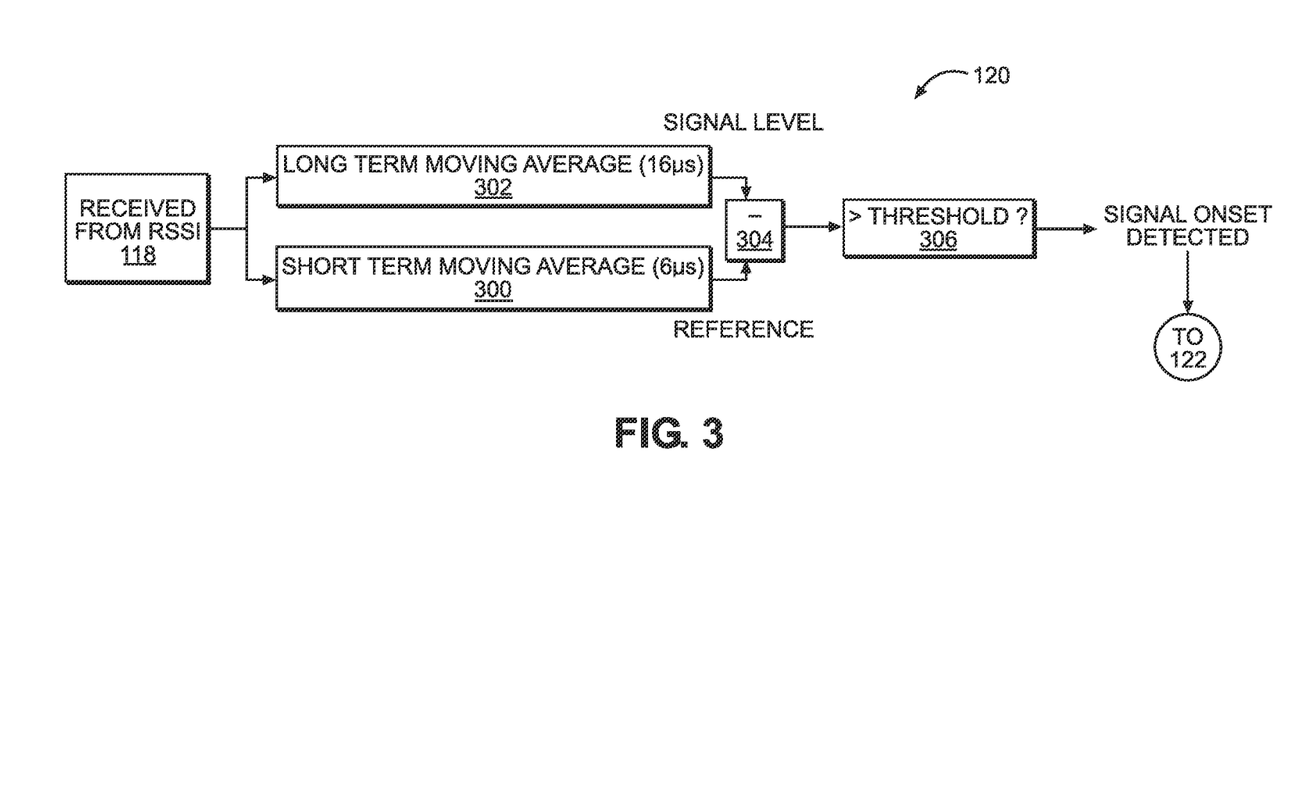
FIG. 3 is a block diagram of an exemplary edge detection circuit for use by the antenna system of FIG. 1.

FIG. 3 illustrates an edge detection circuit 120. The edge detection circuit 120 receives a signal from an associated RSSI circuit 118. The RSSI circuit 118 may average a magnitude of an I and Q sample over a short period of time, then adjust the result with the current gain setting of an associated RFFE. The results may be down-sampled before sending to the edge detection circuit 120. In the edge detection circuit 120, a first circuit 300 forms a short-term moving average, which may cover, for example, 6 µs. A second circuit 302 forms a long-term moving average, which may cover, for example 16 µs. In an exemplary aspect, the edge detection circuit 120 may have a sampling rate of one megahertz (1 MHz). A difference is taken by a difference circuit 304. The difference is, effectively, an indication of how strong a signal (the short-term average) is over a general noise level (the long-term average). This difference is compared to a threshold by a comparator 306, and if the threshold is exceeded, a signal onset detected signal is provided to the antenna selection circuit 122.

Figure 4:
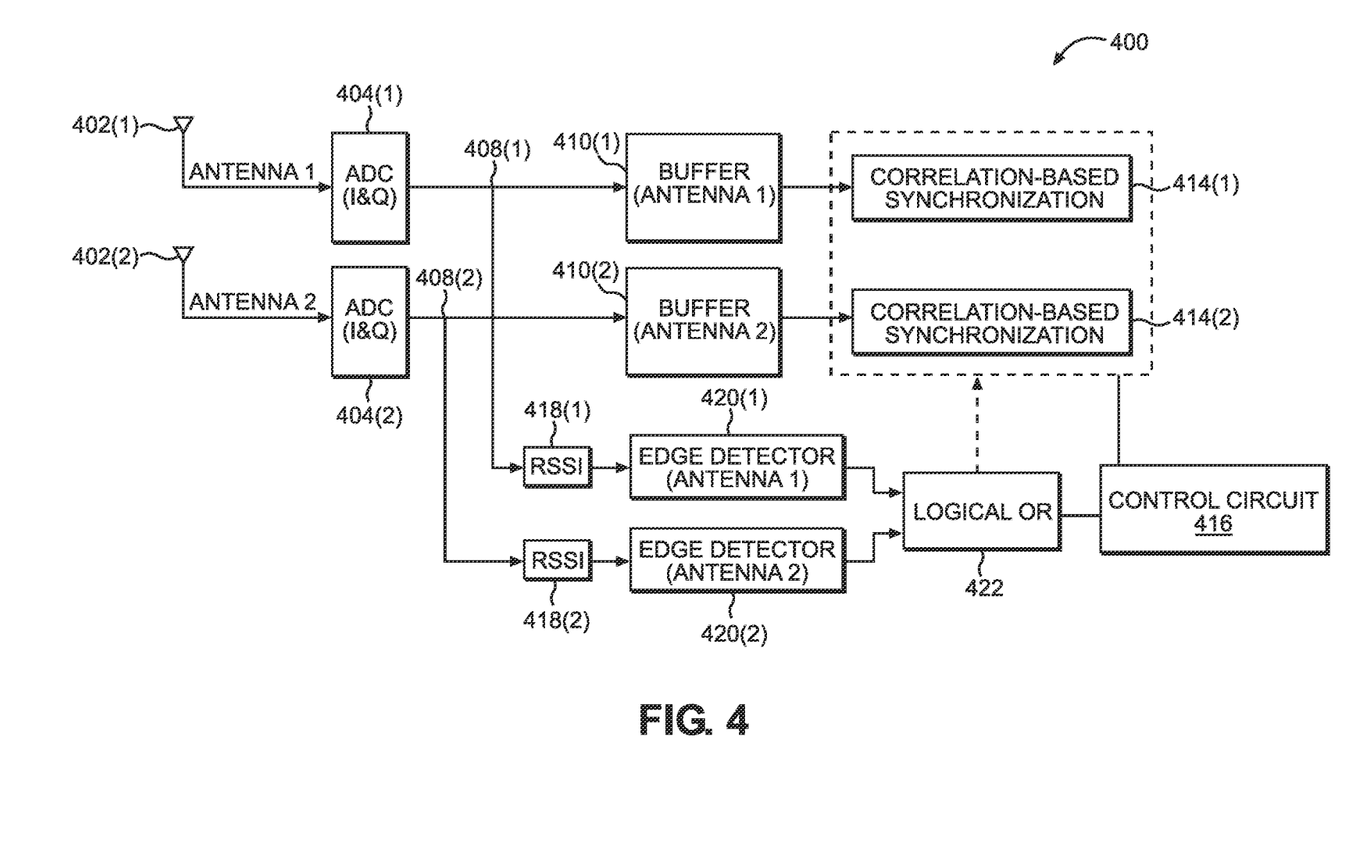
FIG. 4 is a block diagram of an exemplary multiple-antenna system that has parallel synchronization blocks.

There are other ways exemplary aspects of the present disclosure may be implemented. One alternate exemplary receiver 400 is illustrated in FIG. 4. The receiver 400 has antennas 402(1)-402(2). The antennas 402(1)-402(2) may be coupled to respective ADCs 404(1)-404(2). In an exemplary aspect, the ADCs 404(1)-404(2) may process I and Q portions of the signals. DSP blocks to condition the signal for detection (e.g., a channel select filter) may be provided (not shown) on either side of the ADCs 404(1)-402(2). Respective nodes 408(1)-408(2) exist after the ADCs 404 (1)-404(2).

The signals from the antennas 402(1)-402(2) are split at the respective nodes 408(1)-408(2). Respective first portions of the signals are provided to buffers 410(1)-410(2). The buffers 410(1)-410(2) are coupled to respective synchronization circuits 414(1)-414(2). The synchronization circuits 414(1)-414(2) may be coupled to and controlled by a control circuit 416.

Respective second portions of the signals are provided from the nodes 408(1)-408(2) to respective RSSI circuits 418(1)-418(2). The respective RSSI circuits 418(1)-418(2) are coupled to respective edge detection circuits 420(1)-420 (2). The edge detection circuits 420(1)-420(2) may be identical to the edge detection circuit 120 of FIG. 3 and may be coupled to an antenna selection circuit 422, which may be a logical OR circuit. While shown as a distinct circuit in FIG. 4, the antenna selection circuit 422 may be part of the control circuit 416.

In the receiver 400, both synchronization circuits 414(1)-414(2) are initially in a sleep or low-power mode, but may be activated together when one or the other edge detection circuit 420(1)-420(2) detects a signal. The synchronization circuits 414(1)-414(2) may then operate to facilitate creating a combined signal, thereby taking advantage of the diversity options available from the antennas 402(1)-402(2). This approach achieves better performance, albeit at the cost of greater power consumption. While not optimal for batteryoperated IoT devices, a mains-supplied IoT device (e.g., a refrigerator, set-top box, or the like) may find such design compromise acceptable. This approach may also do a better job of selecting a better antenna because the antenna selection may be based on the correlation calculations rather than merely edge detection. Finally, this approach can be used for more advanced multiple input-multiple output (MIMO) processing techniques, including space time coding, where the transmitting system encodes information across multiple antennas.

As another option that could be implemented by either the receiver 100 or the receiver 400, the control circuit 116 or 416 may initially select an antenna based on the output from the edge detection circuits 120, 420(1)-420(2), but, if ambiguity or uncertainty occurs, activate the correlation-based synchronization. This approach achieves excellent antenna selection performance while also generally reducing power consumption in most cases.

Figure 5:
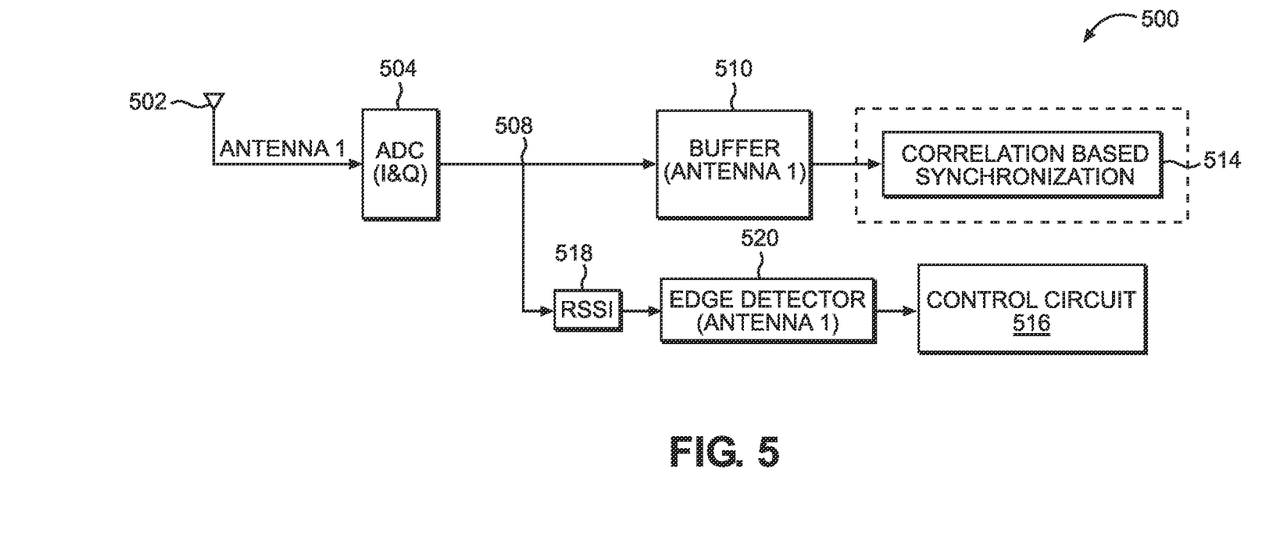
FIG. 5 is a block diagram of an exemplary single-antenna system which may use the edge detection of the present disclosure for power savings.

Another alternate receiver 500 is illustrated in FIG. 5. The receiver 500 may be a single antenna receiver having only an antenna 502. The antenna 502 may be coupled to an ADC 504. In an exemplary aspect, the ADC 504 may process I and Q portions of the signals. Immediately before, or immediately after the ADC 504 other DSP blocks to condition the signal for detection (e.g., a channel select filter) may be provided. A node 508 may exist after the ADC 504.

The signal from the antenna 502 is split at the node 508. A first portion of the signal is provided to a buffer 510. The buffer 510 is coupled to a synchronization circuit 514. The synchronization circuit 514 may be coupled to and controlled by a control circuit 516.

A second portion of the signal is provided from the nodes 508 to an RSSI circuit 518. The RSSI circuit 518 is coupled to an edge detection circuit 520, which may be identical to the edge detection circuit 120. The edge detection circuit 520 may be coupled to the control circuit 516.

Similar to the discussion above, the synchronization circuit 514 may remain in a sleep or low-power mode until activated by the control circuit 516 based on an indication that a signal has been received and detected by the edge detection circuit 520. This arrangement still provides power savings for the receiver 500 relative to a system that uses the synchronization circuit to detect signals.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A receiver comprising:
   a received signal strength indicator (RSSI) circuit configured to receive a signal from an antenna;
   an edge detection circuit coupled to the RSSI circuit and configured to detect a new incoming signal compared to an existing environment;
   a synchronization circuit configured to use a correlation algorithm to synchronize to the signal from the antenna; and
   a control circuit coupled to the edge detection circuit and the synchronization circuit and configured to:
   turn off the synchronization circuit; and
   responsive to detection of the new incoming signal by the edge detection circuit, turn on the synchronization circuit.

2. The receiver of claim 1, wherein the incoming signal comprises a BLUETOOTH LOW ENERGY (BLE) signal.

3. The receiver of claim 1, wherein the edge detection circuit is configured to sample an output of the RSSI circuit at one megahertz (1 MHz).

4. The receiver of claim 1, further comprising an analog-to-digital converter (ADC) coupled to the RSSI circuit.

5. The receiver of claim 4, further comprising a buffer positioned between the ADC and the synchronization circuit.

6. The receiver of claim 1, further comprising:
   a second RSSI circuit configured to receive the signal from a second antenna; and
   a second edge detection circuit coupled to the second RSSI circuit and configured to detect the new incoming signal compared to the existing environment.

7. The receiver of claim 6, further comprising a second synchronization circuit configured to use the correlation algorithm to synchronize to the signal from the antenna, wherein the control circuit is configured to:
   turn off the second synchronization circuit; and
   responsive to one of the edge detection circuit or the second edge detection circuit detecting the new incoming signal, turn on one of the synchronization circuit or the second synchronization circuit.

8. The receiver of claim 5, further comprising a second buffer and a second ADC configured to be coupled to the second antenna.

9. The receiver of claim 1, wherein the edge detection circuit comprises a short-term averaging circuit and a long-term averaging circuit.

10. The receiver of claim 9, wherein the edge detection circuit further comprises a difference circuit configured to calculate a difference between an output from the short-term averaging circuit and an output from the long-term averaging circuit.

11. A method for controlling a receiver, comprising:
    turning off a synchronization circuit;
    detecting an incoming signal with first edge detection circuit based on a first received signal strength indication (RSSI) from a first RSSI circuit;
    detecting the incoming signal with a second edge detection circuit based on a second RSSI from a second RSSI circuit; and
    responsive to detecting the incoming signal, turning on the synchronization circuit.

12. The method of claim 11, further comprising using a received signal strength indicator (RSSI) circuit to provide an RSSI signal to the edge detection circuit.

13. The method of claim 11, further comprising buffering the incoming signal while detecting.

14. The method of claim 11, further comprising detecting a packet in the incoming signal.

15. The method of claim 11, further comprising not detecting a packet in the incoming signal within a predetermined time out window.

16. The method of claim 11, further comprising selecting between signals from at least two antennas.

17. A receiver comprising:
- a first node configured to be coupled to a first antenna;
- a second node configured to be coupled to a second antenna;
- a first received signal strength indicator (RSSI) circuit configured to receive a first signal from the first node;
- a second RSSI circuit configured to receive a second signal from the second node;
- a first edge detection circuit coupled to the first RSSI circuit and configured to detect a new incoming signal compared to an existing environment;
- a second edge detection circuit coupled to the second RSSI circuit and configured to detect the new incoming signal compared to the existing environment;
- a synchronization circuit configured to use a correlation algorithm to synchronize to the signal from the antennas; and
- a control circuit coupled to the edge detection circuit and the synchronization circuit and configured to:
  - turn off the synchronization circuit; and
  - responsive to detection of the new incoming signal by either one of the first edge detection circuit or the second edge detection circuit, turn on the synchronization circuit.

\* \* \* \* \*